United States Patent [19]

Clary

[11] Patent Number: 5,187,351
[45] Date of Patent: Feb. 16, 1993

[54] PROCESSING OF BANK DOCUMENTS

[75] Inventor: John G. Clary, Pasadena, Calif.

[73] Assignee: Addmaster Corporation, Monrovia, Calif.

[21] Appl. No.: 839,712

[22] Filed: Feb. 24, 1992

Related U.S. Application Data

[63] Continuation of Ser. No. 580,276, Sep. 10, 1990, abandoned.

[51] Int. Cl.[5] .......................................... G06G 15/30
[52] U.S. Cl. .................................. 235/379; 235/449; 235/454; 902/5
[58] Field of Search ............... 235/449, 379, 437, 468, 235/487, 454; 902/5

[56] References Cited

U.S. PATENT DOCUMENTS

| | | | |
|---|---|---|---|
| 3,949,363 | 4/1976 | Holm | 235/437 |
| 4,007,462 | 2/1977 | Wetsel | 235/487 |
| 4,672,377 | 6/1987 | Murphy | 902/5 |
| 4,685,138 | 8/1987 | Antes et al. | 235/468 |

Primary Examiner—Harold Pitts
Attorney, Agent, or Firm—Gene W. Arant

[57] ABSTRACT

When the dollar amount of the transaction is first keyed into a machine, a number intended to indicate the dollar amount is printed onto the document both in an optically readable non-magnetic code and in ordinary numerals. By optically reading the non-magnetic code from the document a set of electronic signals is created which represents the number indicative of the dollar amount, and in direct response to that set of electronic signals the number is then printed onto the document in magnetic ink.

12 Claims, 2 Drawing Sheets

Fig. 1.
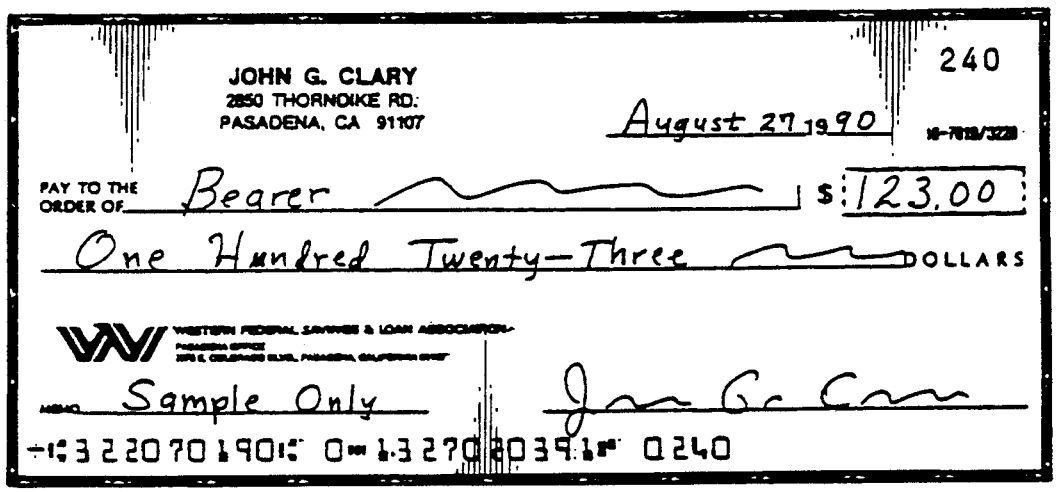
Fig. 2.ᵃ
Fig. 2.ᵇ

BATCH REPORT

CASH CHECKS

FIRST NATIONAL BANK
AUG. 23, 1990          10:30 AM
TELLER #340            BR# 1234

| ACCT# | TRANS | AMT |
|---|---|---|
| 0432-0123-56789 | 100 | $123.00 |
| 0616-4398-23499 | 102 | $1,593.89 |
| 4937-78998 | 104 | $60.00 |
| 1234-09870 | 105 | $500.00 |
| 0099-55777 | 109 | $2,320.60 |
| 0143-223456789 | 110 | $123.00 |

6 CHECKS              $4,234.90

PROCESSING OF BANK DOCUMENTS

This is a continuation of copending application Ser. No. 07/580,276 filed on Sep. 10, 1990 now abandoned.

BACKGROUND OF THE INVENTION

Although the institutional processing of financial documents has now become highly automated, a great deal of handling by staff personnel is still required. The basic considerations of honesty and accuracy are always of paramount importance. In addition, speed and cost factors may be critical to an institution's competitive position within the industry.

Each branch of a bank or similar institution typically handles thousands of transactions every day. Among the most common transactions are the cashing of checks written on the same bank, the cashing of checks written on other banks, deposits without cash back, and deposits with cash back. At least a dozen other transactions are also quite commonplace.

Clearing house procedures have been greatly simplified by use of magnetic ink codings of the type shown in U.S. Pat. No. 3,000,000. The Magnetic Ink Character Recognition Code—known in the industry as MICR—has become a standard vehicle that expedites not only the clearing of checks through the Federal Reserve Bank between different banking institutions, but also the clearing within individual banking institutions of transactions between their different branches. Magnetic ink characters that identify both a particular bank and a particular customer's account number are generally pre-printed on each check and deposit slip before they are furnished to the customer. It is an industry standard to place the MICR that identifies the banking institution on the lower left of the front face of the check, while the MICR identifying the customer's account number is placed in the lower center.

When the customer later writes a check, he or she writes the dollar amount of the transaction on the face of the check in ordinary numerals, i.e., the commonly used arabic numerals. Whether these numerals are written in pen or ink, or typed with a typewriter, they have no magnetic characteristics and hence cannot be identified by the same sensing devices that sense the MICR coding. The machines used to clear the checks operate only in response to the MICR code. It is therefore an industry practice to use a MICR encoding machine to print on each check in magnetic ink the dollar amount for which that check has been written. According to the industry standard this MICR coding of the dollar amount is placed on the lower right of the face of the check, on a common line with the other pre-printed MICR codes.

At many of the major banks today, each teller has his or her own supply of cash, and will transfer a batch of checks several times a day to an operations officer. The teller starts the day with a certain amount of cash and enters his opening cash balance on his own computer (often his own terminal of the bank's computer network). Upon transferring a batch of checks, the teller uses an electronically operated machine to create a Batch Report which includes a tape list and total for that batch, and then gives it to the operations officer along with the batch of checks. When the teller needs more cash, he or she obtains more from the vault, is charged with that amount, and adds that amount to the computer total. At the end of the day, after closing, the teller adds starting cash plus all cash "bought" from the vault, subtracts the sum of all batches traded out during the day, and the balance must then equal the amount of cash in the drawer. If these amounts do not balance, the operations staff generally have the responsibility of locating and correcting the errors.

It is a general practice in all but the smallest banking institutions to process all checks and other documents evidencing the day's transactions through a proofing center. Such centers are often located somewhere other than in the office where the bank deals with its customers. The proofing function may involve a number of account-balancing and error-detecting procedures. It is generally at the proofing center that the dollar amount of the transaction is keyed into a MICR encoding machine and printed onto the lower right corner of the face of the check.

In some instances a customer may need to cash a check or make a deposit, but does not have a pre-printed form with him at the time. It is then necessary to use a blank form of check or deposit slip, and to write the account number on it. Many bank offices are equipped with a MICR encoding machine in order to expedite this process. The teller then keys into the machine the customer's account number which the machine prints in magnetic ink onto the check or deposit form.

MICR encoding machines are both too bulky and too expensive to be positioned at every teller station, however, hence at the present time some bank offices are not equipped with even one such machine.

It is always of interest to the banking industry to find new procedures which will increase speed and efficiency, decrease error rates, and at the same time maintain the necessary managerial checks against dishonesty of customers or employees.

SUMMARY OF THE INVENTION

In accordance with the present invention the method of preparing the check or other document for clearing comprises the following steps. First, and preferably when the document is initally presented to a bank or commercial institution, a number indicative of the dollar amount of the transaction is keyed into a manually controlled machine and then printed onto the document both in an optically readable non-magnetic code and in ordinary numerals which can be readily understood by any person. Second, either at an encoding and proofing center or at any preceding office where the document is handled, a machine is used to optically read the non-magnetic code from the document to create a set of electronic signals which then control the printing of that same number onto the document in magnetic ink.

An object of the invention, therefore, is to relieve the encoding and proofing center of the manual work of keying in MICR, by taking advantage of the fact that a teller or other person to whom the document was initially presented had already been required to key into a machine a number indicative of the dollar amount of the transaction.

A further object of the invention is to speed up the processing of checks and other bank documents through more effective use of automated equipment.

Thus according to the present invention when the document is initially received and keyed into a machine, that machine is used to control the additional function of printing directly onto the document a number that is intended to indicate the dollar amount of the transaction, both in ordinary (arabic) numerals and in an optically readable non-magnetic code. The optically readable code is subsequently used to automate the encoding and printing of the MICR number. Thus, the manual keying in of the number is done only once, rather than twice as has been the customary practice.

A type of error which may be of concern is that the teller or other person who first received the check or other document may have keyed in a dollar number which differs from the actual dollar amount on the check or other document. The machine can be relied on, however, to correctly print the same number both in arabic numerals and in the optically readable code. And the printed arabic number provides ample opportunity to detect and correct such an error, if it exists, in the subsequent processing of the document.

DRAWING SUMMARY

FIG. 1 shows a typical check which has been preprinted with the conventional MICR to identify both a banking institution and a customer account number;

FIG. 2a shows information printed on the back of the check of FIG. 1 at a teller station, in accordance with the novel process of the invention;

FIG. 2b shows an alternate form of information which may be printed on the back of the check of FIG. 1;

DETAILED DESCRIPTION OF THE INVENTION

Figures 3, 4:
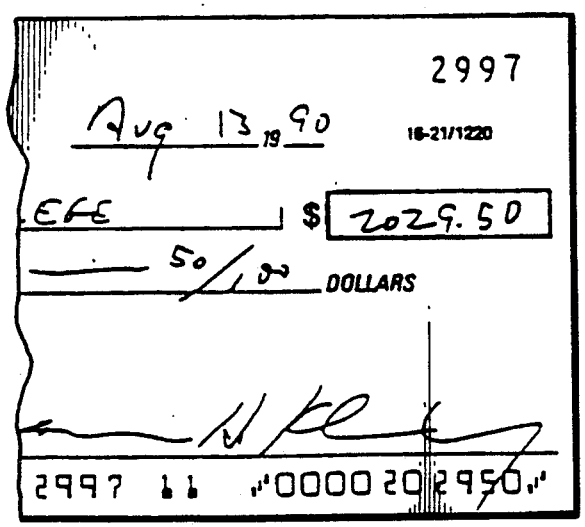
FIG. 3 shows a typical teller's batch report.
FIG. 4 shows a portion of a different check, after it has been cashed and returned by the bank, with the dollar amount printed in MICR code in the lower right hand corner.

For the purpose of illustration the novel process of the present invention is first described with reference to bank operations, where checks presented for cash are later encoded in MICR code with the dollar amount. Thus, FIG. 1 shows a face view of a printed check issued to me by my bank for a personal checking account. It shows check No. 240 in the upper right hand corner. In the upper part of the check, left of center, my name and home address are printed. The institution which carries the account is Western Federal Savings & Loan Association, Pasadena office, and that information is printed on the check near the lower left corner. In the upper right corner, below number 240, the numbers "16-7019/3220" identify the banking institution. All of the foregoing information is printed in ordinary letters and (arabic) numbers, without the use of magnetic ink.

The MICR code is printed along the bottom of the check. At the lower left "322070190" identifies the institution. Then in the bottom center the number "1327020391" identifies both the branch of the institution (Pasadena office) and my personal account number. The last MICR number "0240" shows the check number in a form which the magnetic sensors are able to detect, so that my bank statement, with check numbers included, can be printed out automatically.

As also shown in FIG. 1, the check has been written for the sum of $123.00 under date of Aug. 27, 1990. This information has been written with pen and ink, as commonly happens in business transactions.

After the check has been written as shown in FIG. 1 it is then presented to a bank for cashing. The teller must follow proper procedures such as to determine that funds are available and to identify the person who seeks to cash the check, and perhaps to make an entry against that person's account. When the teller is ready to give the customer the money for the check, the transaction is first entered into the teller's computer terminal or calculator.

The transaction is entered by manually keying all the required information into the keyboard of the computer terminal or calculator, so as to produce a set of electronic signals representing the keyed information, including the dollar amount of the check. In response to those electronic signals, the machine then causes all the information shown in FIG. 2a to be printed onto the back of the check. The teller can accomplish this result by keying in the information only one time. If necessary, two or more separate printing machines may be operated under control of the single computer terminal or calculator so as to print all the information as shown. Preferably, however, a single machine is provided which responds to the electronic signals for printing all of the information, including the printing of the dollar amount both in optically readable non-magnetic code and in ordinary man-readable numerals.

According to the novel method of the present invention the dollar amount is written both in a form most easily readable by human beings, which is the ordinary or arabic numerals; and in the form most easily printed and read by machine, which is optically readable non-magnetic code. In the present state of technology the various forms of bar code are most easily printed and read by machine. At the present time there are a number of different versions of bar code which are used by banks and other types of business establishments. See the book "Reading Between The Lines—An Introduction to Bar Code Technology", by Craig K. Harmon and Russ Adams, published in 1984 by North American Technology, Inc., 174 Concord Street, Peterborough, N.H. 03458, second edition, 1985. The method or process of the present invention does not require any one particular version of bar code, although "Code 39" or "Interleaved 2 of 5" may be preferred. The significant fact is that the use of bar code permits the check or other document to be advanced at great linear speed while it is being read for the purpose of encoding the dollar amount in MICR code.

The items of information shown in FIG. 2a are as follows. On the left is bar code representing the number 12300 which then indicates an amount of $123.00. Next are the letters "WFB" which are the identification of the bank or branch. Next appears "AU28 '90 10:15" which indicates the date and time the check was cashed. Then the dollar amount $123.00 appears in ordinary (arabic) numerals. And finally the letters "CK" are a transaction code indicating the type of transaction.

It will be noted in FIG. 2a that all of the information is printed on a common line. While variations are possible, this approach is preferred in accordance with the invention.

Referring now to FIG. 2b, there is shown an alternate form of the information to be printed on the check by the teller. Bar code indicating the dollar amount $123.00 is again at the left. Next appears "M12A" which identifies the teller or the branch. Next is the number "103" which is the transaction number. Then the dollar amount $123.00 appears in ordinary (arabic) numerals. And finally the letters "CK" are the transaction code.

As indicated in an earlier paragraph, there is always some possibility that the teller may have keyed in a dollar number which differs from the actual dollar amount on the check. In accordance with ordinary bank procedure, however, the teller will have an opportunity to correct such an error before passing the check on through its normal channels.

Reference is now made to FIG. 3 which illustrates a conventional type of Batch Report. The transactions in this example are fictitious and are shown simply for illustration. A batch of six checks is shown. The total of the six checks is $4234.90. In accordance with ordinary procedure the teller will use the same computer terminal or calculator to print the Batch Report that was previously used for keying in each check as it was received. Before handing the batch of checks to the operations staff, however, the teller will verify the correctness of amounts shown on the Batch Report by direct comparison with the amounts as shown on the faces of the checks. Thus, there is a strong likelihood that any error in keying in the dollar amount will be caught right at the teller station. The teller then hands the Batch Report to the operations officer or staff person along with the checks as listed.

Before the proofing operation, it is necessary to cause the dollar amount for which each individual check has been written to be encoded and printed in the MICR or magnetic ink code upon the face of that check. In accordance with the present invention this is accomplished by using a machine to optically read the bar code from the document and create a set of electronic signals which then control the printing of that same number onto the document in magnetic ink.

Reference is now made to FIG. 4 showing a portion of a check that has been cashed, processed in the presently conventional fashion, and returned by the bank. The handwritten amount of the check is $2029.50. It will also be seen that in the lower right hand corner the amount that was printed in MICR as part of the proofing operation is 0202950.

The foregoing explanation of a typical embodiment of the invention has been given in connection with bank operations. However, the novel method of the present invention may also be utilized with an equal or perhaps even greater advantage in commercial establishments such as retail stores. As in the case of the bank process, information when once initially keyed into a machine is then represented by electronic signals which control all subsequent operations.

In a typical retail store the cashier who accepts the check may be equipped with printing apparatus under control of the cash register which will print information on the check as shown in FIG. 2a or 2b. The store may also operate its own MICR encoding center where checks are optically read from the bar code and the MICR code printed on them. By such arrangements the store may then avoid extra charges which banks often make for large numbers of checks that are received without their dollar amounts printed in MICR code. It should be noted that use of the process in a retail store accomplishes the same advantages as when carried out completely within the confines of a bank—that is, only one keying operation is needed, and an opportunity then immediately exists to discover any error that may have been made in that keying operation.

While the present discussion has been principally directed to the processing of checks, it will understood that there are other financial documents which must be, or may be, processed in a similar manner, and hence the method and principles of the present invention apply to them also.

While a particular embodiment of the invention has been described in detail in order to meet the disclosure requirements of the patent laws, it will be understood that the scope of the invention is to be measured only in accordance with the appended claims.

What I claim is:

1. In the art of processing a bank document upon which characters pre-printed in magnetic ink identify both a particular bank and a particular account, and upon which ordinary numerals have also been written to specify the dollar amount of a financial transaction, the process of then preparing the document for clearing, which comprises the steps of:

under manual control, creating a first set of electronic signals which are intended to represent the dollar amount;

then, in direct response to said first set of electronic signals, printing a corresponding number representing the dollar amount on a selected are of the document both in man-readable numerals and in non-magnetic bar code;

in direct response to said first set of electronic signals, also printing the same number in man-readable numerals on a batch report;

thereafter optically reading the bar code from the document to create a second set of electronic signals which represent the same number; and in direct response to said second set of electronic signals, printing the number on the document in Magnetic Ink Character Recognition Code.

2. The method of claim 1 wherein, in direct response to said first set of electronic signals, the number is printed both in bar code and in man-readable letters on a common line.

3. The method of claim 2 wherein said first set of electronic signals also represent additional information identifying the transaction, and said additional information is also printed on said common line in man-readable letters.

4. The method of claim 2 wherein said common line is printed on the back of the document and the number is printed in magnetic ink on the front of the document.

5. In the art of processing a bank document upon which characters pre-printed in magnetic ink identify both a particular bank and a particular account, and upon which ordinary numerals have also been written to specify the dollar amount of a financial transaction, the process of then preparing the document for clearing, which comprises the steps of:

under manual control, creating a first set of electronic signals which are intended to represent the dollar amount;

then, in direct response to said first set of electronic signals, printing a corresponding number representing the dollar amount on a common line on a selected are of the document both in man-readable numerals and in an optionally readable non-magnetic code;

thereafter optically reading the non-magnetic code from the document to create a second set of electronic signals which represent the same number; and in direct response to said second set of electronic signals, printing the number on the document in Magnetic Ink Character Recognition Code.

6. The method of claim 5 wherein said common line is printed on the back of the document and the number is printed in Magnetic Ink Character Recognition Code on the front of the document.

7. The method of claim 5 wherein said first set of electronic signals also represent additional information identifying the transaction, and said additional information is also printed on said common line in man-readable letters.

8. The method of claim 5 wherein, in direct response to said first set of electronic signals, the same number is also printed in man-readable numerals on a batch report.

9. The method of claim 8 wherein said common line is printed on the back of the document and the number is printed in Magnetic Ink Character Recognition Code on the front of the document.

10. The method of claim 8 wherein said first set of electronic signals also represent additional information identifying the transaction, and said additional information is also printed on said common line in man-readable letters.

11. In the art of processing a bank document upon which characters pre-printed in magnetic ink identify both a particular bank and a particular account, and upon which ordinary numerals have later been written to specify the dollar amount of a financial transaction, the method of then preparing the document for clearing which comprises the steps of:

first, under manual control, printing on the document in non-magnetic bar code a number intended to indicate the dollar amount, and concurrently also printing the number upon the document in ordinary letters;

then optically reading the bar code from the document to create a set of electronic signals which represent that number; and thereafter, in direct response to said set of electronic signals, printing the number on the document in Magnetic Ink Character Recognition Code.

12. The method of claim 11 wherein, under manual control, the number is printed both in bar code and in ordinary letters on a common line, and under manual control additional information identifying the transaction is also printed on said common line in ordinary letters.

* * * * *